United States Patent
Chuang et al.

(10) Patent No.: US 7,699,497 B2
(45) Date of Patent: Apr. 20, 2010

(54) BACKLIGHT MODULE AND A LIQUID CRYSTAL DISPLAY MODULE USING THE SAME

(75) Inventors: Yung-Pin Chuang, Hsin-Chu (TW); Szu-Han Li, Hsin-Chu (TW); Ching-Fu Tien, Hsin-Chu (TW); Keng-Ju Liu, Hsin-Chu (TW); Cheng-Hua Tien, Hsin-Chu (TW); Tsung-Hsien Hsieh, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 224 days.

(21) Appl. No.: 11/979,005

(22) Filed: Oct. 30, 2007

(65) Prior Publication Data

US 2008/0112163 A1 May 15, 2008

(30) Foreign Application Priority Data

Nov. 15, 2006 (TW) .............................. 95142225 A

(51) Int. Cl.
*F21V 9/00* (2006.01)
(52) U.S. Cl. ...................................... 362/231; 362/97.3
(58) Field of Classification Search ............... 362/97.1, 362/97.2, 97.3, 231, 330, 511, 551, 558, 362/561
See application file for complete search history.

(56) References Cited

U.S. PATENT DOCUMENTS

| 7,607,800 | B2 * | 10/2009 | Park ............................ 362/240 |
| 2002/0176164 | A1 * | 11/2002 | Motomura et al. .......... 362/561 |
| 2005/0002205 | A1 * | 1/2005 | Yu et al. ...................... 362/555 |
| 2005/0265043 | A1 * | 12/2005 | Tseng et al. ................. 362/558 |
| 2005/0275767 | A1 | 12/2005 | Huang et al. |
| 2008/0002391 | A1 * | 1/2008 | Lee ............................... 362/97 |

FOREIGN PATENT DOCUMENTS

| CN | 1521542 | 8/2004 |
| CN | 1588201 | 3/2005 |
| CN | 1727953 | 2/2006 |

\* cited by examiner

*Primary Examiner*—David V Bruce
(74) *Attorney, Agent, or Firm*—Bacon & Thomas, PLLC

(57) ABSTRACT

A backlight module for a liquid crystal display (LCD) device includes a bottom plate, a plurality light sources, a light-premixing unit, and a light-mixing unit. The light sources are mounted on the bottom frame. The light-premixing unit is located above the bottom frame. The light-premixing unit includes a first diffuser. The light-mixing unit is located at a distance above the light-premixing unit. The light-mixing unit includes a second diffuser. The backlight module can effectively reduce the thickness of and meet the slim-line requirement of the LCD.

17 Claims, 3 Drawing Sheets

US 7,699,497 B2

BACKLIGHT MODULE AND A LIQUID CRYSTAL DISPLAY MODULE USING THE SAME

BACKGROUND OF THE INVENTION

1. Field of the Invention

The present invention relates to a backlight module and a liquid crystal display (LCD) module using the same, and more particularly, to a backlight module with a reduced light mixing height and an LCD device using the backlight module.

2. Description of Related Art

LCDs are widely applied in a current information product or appliance since they have the advantages of lower prices and mature manufacturing technologies.

An LCD typically uses a passive way to display. Namely, the display requires a backlight module for illumination so that the LCDs generally comprise the backlight modules. The backlight module essentially provides a uniform and sufficient light to an LCD panel and is one of the main optical modules for the LCD. Currently, a light source with LEDs contributes a breakthrough to LCD products, which relatively improves the lighting efficiency to process the efficiency about a half of a cold cathode florescent lamp (CCFL). Also, the LEDs are a low-power self-illuminating light source and typically an auxiliary light source for power-saving products. Therefore, considerable research has included the LEDs in the backlight module of an LCD as a light source.

In a backlight module using a plurality of LEDs as a light source, a mixture of white light is proportioned to the distances between the LED light sources and the light-mixing heights. The different distances between the light sources have the different light-mixing heights. When the distance between the light sources is fixed, a light-mixing unit is used to reduce the light-mixing height. FIG. 1 is a top view of a frame 10 with a typical direct-type light-mixing LED backlight module. FIG. 2 is a schematic side view of the typical backlight module of FIG. 1. As shown in FIG. 1, the frame 10 has a bottom plate 11. The material of the bottom plate 11 can be a metal or polycarbonate (PC). The frame 10 contains a light-mixing unit 13 (FIG. 2) of the backlight module. The bottom plate 11 has a plurality of LEDs 12 in an array arrangement, which emit red, blue and green beams. As shown in FIG. 2, the light-mixing unit 13 is located above the LEDs 12. The red, blue and green beams emitted by the LEDs 12 are mixed in partial areas above the bottom plate 11 to thereby form a white light at, for example, area A, but the result may not be a completely white light. The light-mixing unit 13 is a diffusing mechanism to diffuse the beams emitted by the LEDs 12 so as to expand the lighting angle of the LEDs 12 and to make the light uniform. The light-mixing unit 13 has a diffuser and a transparent plate. The diffuser can be loaded on the transparent plate. The light is delivered from the light-mixing unit 13 to an LCD panel 14 via area B.

In this case, a uniform color light can be generated by meeting a specific diffusing height and using the light-mixing unit 13, after the LEDs 12 have emitted the different colors. The diffusing height required for the uniform color light is about 50 mm and more. Namely, since the lighting angle emitted by the LEDs 12 is not large, a certain distance between the light-mixing unit 13 and the plate 11 is required for completely mixing the different color light emitted by the LEDs 12 and further providing a uniform and good color rendering white light to the LCD panel 14. If the light-mixing unit 13 is very close to the LEDs 12, the lighting angle of the LEDs 12 is not significantly expanded. If the light-mixing unit 13 has two diffusers, the brightness is reduced and the diffusing height cannot be reduced effectively.

As cited, in the aforementioned backlight module, the thickness of which is limited by the distance between the light-mixing unit and the bottom plate, so the entire thickness of the LCD cannot meet the slim-line trend. Therefore, it becomes an important issue to shorten the distance between the light-mixing unit and the bottom plate and to provide a slim LCD to mitigate and/or obviate the aforementioned problems.

SUMMARY OF THE INVENTION

An object of the present invention is to provide a backlight module, which includes a bottom plate, a plurality of light sources, a light-premixing unit and a light-mixing unit. The bottom plate has multiple light mounting holes for arranging the light sources that have two or more different colors. The light-premixing unit includes at least one first diffuser and is located above the bottom plate. The light-mixing unit includes a second diffuser and is located at a distance above the light-premixing unit.

Another object of the present invention is to provide a liquid crystal display (LCD) device with the backlight module.

In the present invention, the light-premixing unit is located above the bottom plate at a distance ranging from 4 to 6 mm. The at least one first diffuser of the light-premixing unit is a diffuser with a high diffusivity and, preferably, with a haze value greater than 70%. Such a high-diffusivity diffuser can increase the light-mixing diffusion to thereby reduce the entire thickness of the backlight module. In the light-premixing unit, a first diffuser is located on a first transparent plate. The first diffuser can diffuse the light emitted by the light sources. The material of the first diffuser can be a PC (polycarbonate), PET (polyethylene terephthalate), PS (polystyrene), PMMA (polymethyl methacrylate), or MS (methyl methacrylate-styrene copolymer). The first transparent plate is loaded on the first diffuser, and the material thereof can be any transparent material, but preferably is an acrylic material, a polycarbonate material, a cycloolefin copolymer (COC), or glass, and more preferably is the acrylic material.

In the present invention, the second diffuser of the light-mixing unit is located on a second transparent plate and, the same as the function of the first diffuser, diffuses the light coming from the first diffuser. The material of the second diffuser can be a PC (polycarbonate), PET (polyethylene terephthalate), PS (polystyrene), PMMA (polymethyl methacrylate), or MS (methyl methacrylate-styrene copolymer). The second transparent plate is loaded on the second diffuser, and the material can be any transparent material, but preferably is an acrylic material, a polycarbonate material, a cycloolefin copolymer (COC), or glass, and more preferably is the acrylic material.

Because the present invention uses the light-premixing unit to preprocess the light, the distance between the light-mixing unit and the bottom plate can be reduced to thereby reduce the entire thickness of the LCD module. The distance can be smaller than 45 mm, and preferably is smaller than 40 mm.

In the present invention, the light-premixing unit and the light-mixing unit can have the same or different material and structure. When the same material is applied to the two units, the cost is reduced and thinning the backlight module becomes more efficient.

In the present invention, the backlight module further comprises one or more optical films located on the light-mixing unit, the light-premixing unit or both. The optical films can be a prism or light-enhancing sheet. The prism or light-enhancing sheet can increase the brightness of the backlight module.

In the invention, the light sources of the backlight module can provide enough brightness on illumination. The light sources can be a CCFL (cold cathode fluorescent lamp), HCFL (hot cathode fluorescent lamp), EL (electroluminescence) sheet, halogen illuminator or LEDs. Preferably, the LEDs are used. The light sources comprise red, green and blue light, and a uniform white light can be obtained by using the light-premixing unit to mix the red, green and blue beams emitted by the light sources and by using the light-mixing unit to expand the lighting angle. However, it is not limited to the white light after light-mixing, depending on the user requirements, even using a color light the same as the light sources.

In the present invention, the backlight module is a direct type backlight module.

As cited, the present invention provides a backlight module to have both the illumination efficiency and the desired light-mixing effect. The light-premixing unit is added to increase diffusion of the mixed light without sacrificing the illumination efficiency of the backlight module. In addition, the thickness of the LCD module is relatively reduced to become thinner, which further provides more options for the market.

Other objects, advantages, and novel features of the invention will become more apparent from the following detailed description when taken in conjunction with the accompanying drawings.

DETAILED DESCRIPTION OF THE PREFERRED EMBODIMENT

For better understanding, not for limit, preferred embodiments of the invention are described below.

The drawings are simplified, and only the elements shown are for description and are not for practice regarding the numbers and shapes thereof.

Embodiment 1

Figure 1:
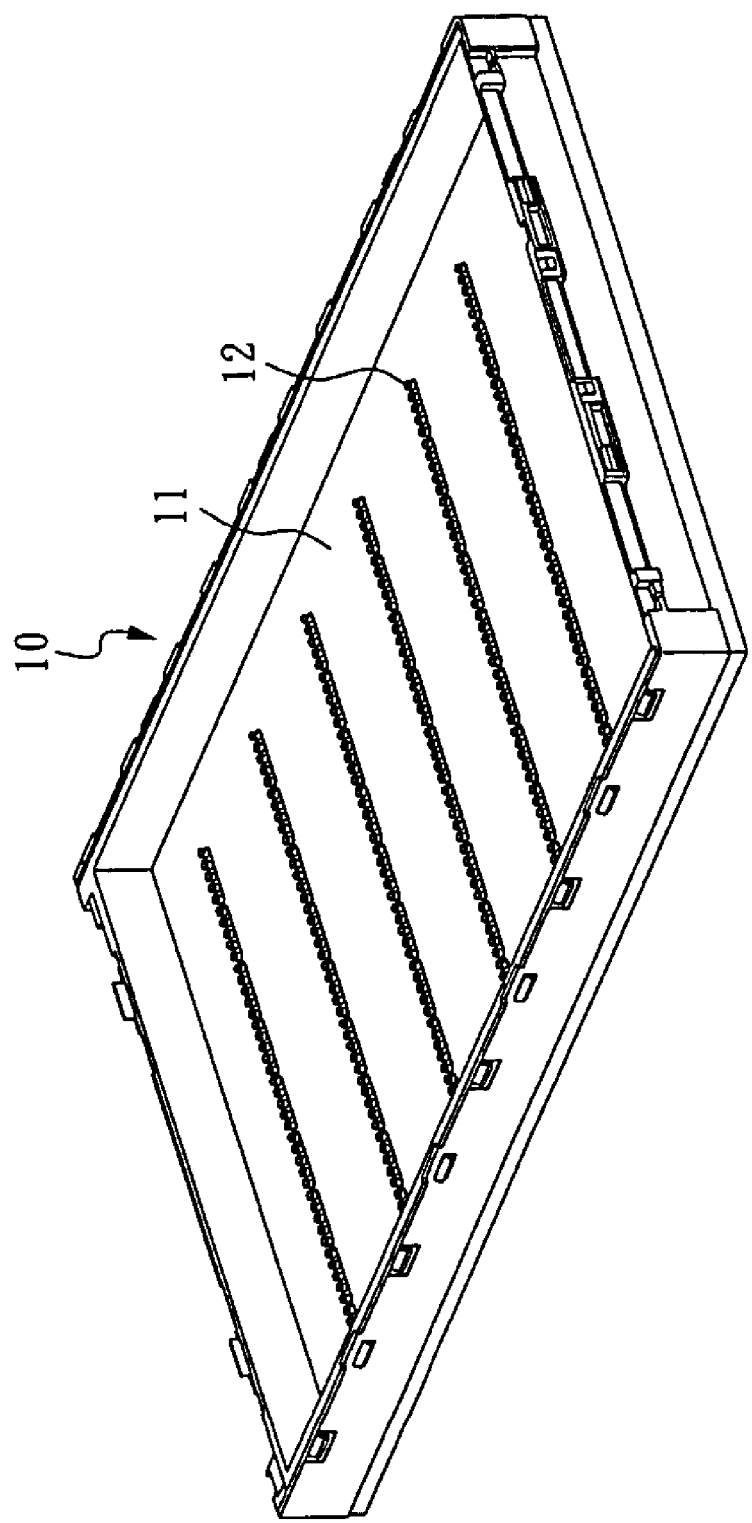
FIG. 1 is a top view of a frame with a typical direct-type light-mixing LED backlight module.
Figure 2:
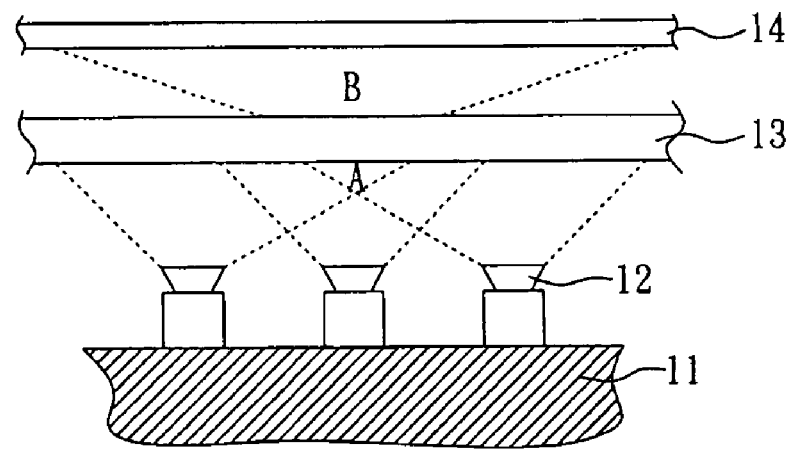
FIG. 2 is a schematic side view of the typical backlight module of FIG. 1.
Figure 3:
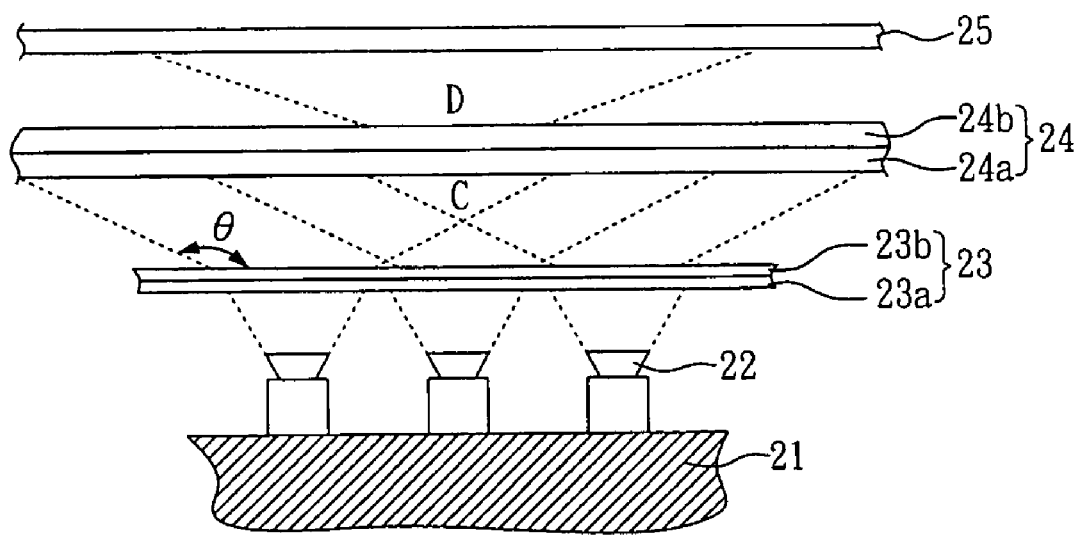
FIG. 3 is a schematic sectional view of an LCD module with a backlight module according to a preferred embodiment of the invention.

FIG. 3 is a schematic sectional view of an LCD module with a backlight module according to the present invention. As shown in FIG. 3, the backlight module includes a bottom plate 21, a plurality of light sources 22, a light-premixing unit 23 and a light-mixing unit 24. The bottom plate 21 has multiple light mounting holes (not shown). The light sources are LEDs arranged in the light mounting holes. The LEDs include red light, blue light and green light.

The light-premixing unit 23 comprises a first diffuser 23b and is located at 4-6 mm above the bottom plate 21. The light-premixing unit 23 uses the first diffuser 23b to be loaded on a first transparent plate 23a. The material of the first transparent plate 23a can be a transparent acrylic plate, where the first transparent plate 23a loads with the first diffuser 23b of high diffusivity. The material of the first diffuser 23b can be a polycarbonate (PC) or polyethylene terephthalate (PET) that has a haze value of about 74.5%, thereby increasing diffusion of the mixed light.

The light-mixing unit 24 comprises a second diffuser 24b and is located at a distance above the light-premixing unit 23. The distance between the light-mixing unit 24 and the bottom plate 21 is shortened because of the light-premixing unit 23 in the middle. Namely, the high diffusivity of the light-premixing unit 23 can be applied to reduce the distance between the light-mixing unit 24 and the bottom plate 21 to about 40 mm at the initial period of mixing of the different-color light sources 22 (LEDs). The light-mixing unit uses a second transparent plate 24a to load a second diffuser 24b. The material of the second transparent plate 24a can be a transparent acrylic plate. The material of the second diffuser 24b can be a PC (polycarbonate) or PET (polyethylene terephthalate).

In this embodiment, the light sources 22 emit a light from the bottom plate 21. The light passes through the light-premixing unit 23, and thus the lighting angle is expanded greater than the prior art. Accordingly, the height of the light-mixing unit 24 can be reduced. Subsequently, the light travels in a manner as shown in FIG. 3 in which partial rays are mixed as a white light before it reaches to the light-mixing unit 24. For example, the light in area C is a white light achieved by mixing red light, green light and blue light. Next, the lighting angle is further expanded by the light-mixing unit 24 to thereby function as a diffusing mechanism to obtain the light uniformity. The white light in area D travels to an LCD panel 25. Thus, the LCD module is completed.

Besides, when the backlight module is applied to an LCD device, typical optical films such as a prism or light-enhancing sheet can be combined on the light-premixing unit 23 or the light-mixing unit 24, or both, to thereby increase the entire optical performance.

Embodiment 2

Figure 4:
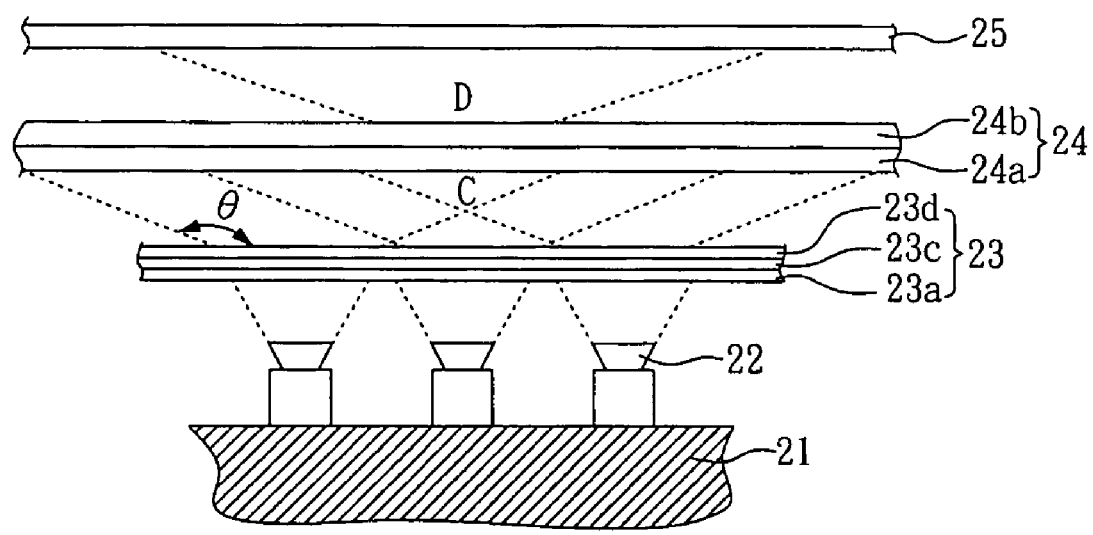
FIG. 4 is a schematic sectional view of an LCD module with a backlight module according to another preferred embodiment of the invention.

FIG. 4 is a schematic sectional view of an LCD device with a backlight module according to another embodiment of the invention.

In this embodiment, the backlight module is the same as that in the embodiment 1 except that the light-premixing unit 23 uses two first diffusers 23c, 23d stacked on the first transparent plate 23a. The material of the first diffusers 23c, 23d can be a PC (polycarbonate) or PET (polyethylene terephthalate) with a haze value of about 74%. The first diffusers 23c, 23d can further expand the lighting angle, such that the distance between the light-mixing unit 24 and the bottom plate 21 is further reduced to about 35 mm.

Embodiment 3

In this embodiment, the backlight module is the same as that in the embodiment 1 shown in FIG. 3 except that in the light-premixing unit 23 the first diffuser 23b with a haze value of about 74.5% is replaced with a first diffuser 23b with a haze value of about 88%. In this embodiment, similarly, the first diffuser 23b with the haze value of about 88% is located on the first transparent plate 23a, such that the distance between the light-mixing unit 24 and the bottom plate 21 can be reduced to about 38 mm.

Embodiment 4

In this embodiment, the backlight module is the same as that in the embodiment 2 shown in FIG. 4 except that in the light-premixing unit 23 the two first diffusers 23c, 23d each with a haze value of about 74% is replaced with two first diffusers 23c, 23d each with a haze value of about 88%. In this embodiment, similarly, the first diffusers 23c, 23d with the haze value of about 88% are stacked on the first transparent plate 23a, such that the distance between the light-mixing unit 24 and the bottom plate 21 can be reduced to about 34 mm.

In the cited embodiments, the relevant parameters can be changed with the LED type and arrangement to thereby optimize the adjustment according to the optical requirements in each embodiment.

As cited, the invention provides a backlight module and an LCD module using the same. An optical mechanism benefiting the light premixing is located above the light sources to thereby reduce the distance required for mixing the different primary color LEDs. Accordingly, the distance between the light-mixing unit and the bottom plate is reduced, and the thickness of the LCD module is reduced to thereby meet the thinning requirement so as to increase the competitiveness in marketing.

Although the present invention has been explained in relation to its preferred embodiments, it is to be understood that many other possible modifications and variations can be made without departing from the spirit and scope of the invention as hereinafter claimed.

What is claimed is:

1. A backlight module, comprising:
   a bottom plate having multiple light mounting holes;
   a plurality of light sources arranged in the light mounting holes of the bottom plate and having two or more different colors;
   a light-premixing unit having at least one first diffuser and located above the bottom plate; and
   a light-mixing unit having a second diffuser and located at a distance above the light-premixing unit.

2. The backlight module as claimed in claim 1, wherein the light-premixing unit is located above the bottom plate at a distance ranging from 4 to 6 mm.

3. The backlight module as claimed in claim 1, wherein the at least one first diffuser comprises a diffuser to increase the light-mixing diffusion.

4. The backlight module as claimed in claim 1, wherein the at least one first diffuser has a haze value of greater than 70%.

5. The backlight module as claimed in claim 1, wherein the at least one first diffuser is located on a first transparent plate to diffuse the light emitted by the light sources.

6. The backlight module as claimed in claim 5, wherein the first transparent plate is made of acryl, polycarbonate, cycloolefin copolymer, or glass.

7. The backlight module as claimed in claim 1, wherein the at least one first diffuser is made of polycarbonate (PC), polyethylene terephthalate (PET), PS (polystyrene), PMMA (polymethyl methacrylate), or MS (methyl methacrylate-styrene copolymer).

8. The backlight module as claimed in claim 1, wherein the second diffuser locates on a second transparent plate to diffuses the light coming from the at least one first diffuser.

9. The backlight module as claimed in claim 8, wherein the second transparent plate is made of acryl, polycarbonate, cycloolefin copolymer, or glass.

10. The backlight module as claimed in claim 1, wherein the second diffuser is made of polycarbonate (PC), polyethylene terephthalate (PET), PS (polystyrene), PMMA (polymethyl methacrylate), or MS (methyl methacrylate-styrene copolymer).

11. The backlight module as claimed in claim 1, wherein a distance between the light-mixing unit and the bottom plate is less than 45 mm.

12. The backlight module as claimed in claim 1, wherein the light-premixing unit and the light-mixing unit are made of the same material.

13. The backlight module as claimed in claim 1, further comprising at least one optical film locating on the light-mixing unit.

14. The backlight module as claimed in claim 13, wherein the at least one optical film comprises a prism or light-enhancing sheet.

15. The backlight module as claimed in claim 1, wherein the light sources comprises red light, green light and blue light.

16. The backlight module as claimed in claim 1, wherein at least one of the light sources comprises a light emitting diode.

17. An LCD module comprising a backlight module of claim 1.

* * * * *